Patented Aug. 16, 1949

2,479,212

UNITED STATES PATENT OFFICE 2,479,212

SYNTHESIS OF CARBAZOLE FROM O-AMINOBIPHENYL WITH METAL SALTS AS TAR INHIBITORS

Courtney Conover, Silver Spring, Md., assignor to Monsanto Chemical Company, St. Louis, Mo., a corporation of Delaware No Drawing. Application August 8, 1947, Serial No. 767,653

7 Claims. (Cl. 260—315)

This invention relates to the manufacture of carbazole and especially to processes for manufacturing carbazole from o-aminobiphenyl.

The synthesis of carbazole from o-aminobiphenyl by heating the substance in the vapor phase with oxygen in the presence of a catalyst such as an oxide of vanadium or molybdenum was reported by Morgan and Walls (J. Soc. Chem. Ind. 57, 358, 1938). The vapor phase reaction produces good conversion at 600° C. However, at temperatures as low as 450–550° C. the conversion is almost negligible. The high temperatures necessary for this conversion, the limitations of apparatus and handling inherent in the use of catalysts in conjunction with high temperature vapor phase operations, the hazard from fires and explosions in vapor phase operations, and other problems make new methods of manufacture of carbazole from o-aminobiphenyl desirable.

Efforts have been made to obtain carbazole by fusing o-aminobiphenyl with a nitro compound of the benzene series at temperatures in the range of 340–350° C. This process results in the formation of large portions of a complex tarry residue and a crude carbazole product grossly contaminated and difficult to purify. Moreover, since the nitro compound employed as an oxidation agent in this process is apparently converted to a complex tarry mixture from which no usable product can be recovered, the cost of this material can only be charged as part of the cost of raw material, thereby greatly increasing the cost of the finished product.

One of the objects of the present invention is to provide an improved process for making carbazole by the air oxidation of o-aminobiphenyl in the liquid phase.

Another object is to provide an improved method of oxidizing o-aminobiphenyl in the liquid phase with a minimum formation of tar. Other objects will become apparent from the following description and examples.

This application is a continuation-in-part of my co-pending application, Serial Number 708,938, filed November 9, 1946.

According to the present invention, generally stated, o-aminobiphenyl is oxidized to carbazole in good yields by intimately contacting o-aminobiphenyl in the liquid phase with air, for example, by agitating o-aminobiphenyl in the molten state in the presence of a stream of air or other oxygen-containing gas at a temperature in the range of 300–400° C. As a further embodiment of my invention, the process is desirably conducted in the presence of an inhibitor of tar formation. I have found that metal salts, for example, metal salts of inorganic acids such as cobalt chromate, aluminum nitrate, copper nitrate, cobalt nitrate and ferric nitrate or sodium chromate, or metal salts of organic acids such as manganese, cobalt or lead benzoate or copper or cobalt mono-butyl butyloxy succinate are good inhibitors of tar formation in the process of the present invention.

In the process of the present invention, air may be supplied to the reaction zone under pressure, for example, at a pressure in the range of 10–75 lbs. per sq. in., and desirably in the range of 45–55 lbs. per sq. in. and thereafter vented from the reaction zone. The air stream may be passed through the reaction mixture, although this is not essential when the reaction mixture is vigorously agitated. On the other hand, it may be desirable to employ the air stream as a means for effecting at least part of the agitation, for example, by passing the stream through the reaction mixture. The volume of air brought into contact with the reaction mixture by any desired means during the course of the reaction should be in excess of theory for the oxidation of o-aminobiphenyl to carbazole and desirably approximately 4 to 6 times the theoretical requirement. A suitable rate of flow of air for this purpose may be in the range of 2 to 22 cu. ft. per 100 lbs. of o-aminobiphenyl per minute. This rate of flow may be varied according to the particular conditions employed in each instance.

The tar inhibitor, for example, the metal salt, is desirably employed in amounts of 0.8 parts by weight or more per 100 parts by weight of o-aminobiphenyl although smaller or larger amounts may be employed, for example, with variations in the temperature, pressure, and agitation. I have found that increasing the reaction temperature above 280° C. results in the formation of less tar, although this is accomplished at the expense of lower conversions of o-aminobiphenyl to carbazole. I have also found that the presence of metal salt in amounts hereinbefore set forth result in very marked inhibition of the tar formation, and particularly in the temperature range of 300–375° C.

The carbazole formed by the process of the present invention may be recovered by any desired procedure, for example, the reaction mixture may be dissolved in hot o-xylene and the solution may be filtered while hot. The carbazole crystallizes from the filtrate and is then filtered off, washed with o-xylene and dried. Other suitable solvents such as hot o-dichlorobenzene may be employed in place of o-xylene for the crystallization operation.

The following example will serve to illustrate the novel process of the present invention. This example is merely illustrative and is not to be construed as limiting the invention as defined in the appended claims.

EXAMPLE I

A series of runs were made in which a mixture of 250 grams of o-aminobiphenyl and a metal salt to the extent of 0.0335 gram-atoms of metal per mole of o-aminobiphenyl, was heated to a temperature in the range of 305–310° C. in a jacketed, heated autoclave. The liquid reaction mixture was strongly agitated, for example, by means of a rotary agitator at 480 R. P. M. A stream of air at a pressure of approximately 50 lbs. per sq. in. was admitted to the autoclave at the rate of approximately 2 cu. ft. per minute. The pressure in the autoclave was maintained at approximately 50 lbs. per sq. in. and the reaction mixture was maintained at a temperature in the range of 305–310° C. for approximately 24 hours. Thereafter the pressure was released and the reaction mixture was dissolved in hot o-xylene, filtered while hot and allowed to cool. The crystalline carbazole which separated was filtered off, washed with cold o-xylene and dried. The metal salts employed were manganese benzoate, cobalt benzoate, mixtures of aluminum nitrate, copper nitrate, cobalt nitrate and ferric nitrate, copper mono-butyl butyloxy succinate, lead benzoate, cobalt chromate, sodium chromate, and cobalt mono-butyl butyloxy succinate. Ammonium chromate was also employed. Table I shows the metal salts and the corresponding percentage conversion of o-aminobiphenyl into carbazole and the yield of o-aminobiphenyl consumed.

Table I

| Tar Inhibitor | Percent Conversion of o-aminobiphenyl to Carbazole | Yield on o-aminobiphenyl Consumed, per cent of Theory |
|---|---|---|
| Mn benzoate | 37.4 | 51.8 |
| Co benzoate | 29.1 | 55.8 |
| Al, Cu, Co, Fe nitrates | 35.6 | 57.3 |
| NH₄ chromate | 33.0 | 59.7 |
| Cu mono butyl-butyloxy succinate | 27.8 | 64.0 |
| Pb benzoate | 30.0 | 64.0 |
| Co chromate | 32.3 | 66.5 |
| Na chromate | 32.5 | 68.3 |
| Co mono butyl-butyloxy succinate | 40.7 | 71.0 |

Residual o-aminobiphenyl may be recovered in plant practice from the reaction mixture by distillation after removal of carbazole therefrom and may be employed as part of the charge of succeeding runs.

Additional runs were made in which the time of reaction ranged from 6 to 24 hours and the results were substantially in accordance with those shown in Table I.

I claim:

1. A process of making carbazole comprising intimately contacting o-aminobiphenyl in the liquid phase with an excess of an oxygen-containing gas under pressure in the presence of a metal salt selected from the group consisting of heavy metal nitrates, aluminum nitrate, chromates and heavy metal salts of organic acids, at a temperature in the range of 300–400° C., and subsequently recovering carbazole from the reaction mixture.

2. A process of making carbazole comprising intimately contacting o-aminobiphenyl in the liquid phase with an excess of air under pressure in the presence of a metal salt selected from the group consisting of heavy metal nitrates, aluminum nitrate, chromates and heavy metal salts of organic acids, at a temperature in the range of 300–375° C. for a period of time in the range of 6–24 hours, and subsequently recovering carbazole from the reaction mixture.

3. In the manufacture of carbazole by the air-oxidation of o-aminobiphenyl in the liquid phase, the step comprising intimately contacting o-aminobiphenyl in the presence of a metal salt selected from the group consisting of heavy metal nitrates, aluminum nitrate, chromates and heavy metal salts of organic acids, and in the presence of air at a pressure in the range of 10–75 lbs. per sq. in. and a reaction temperature in the range of 300–375° C. for a period of time in the range of 6–24 hours.

4. In the manufacture of carbazole by the air-oxidation of o-aminobiphenyl in the liquid phase, the step comprising intimately contacting o-aminobiphenyl in the presence of at least 0.8 part by weight of a metal salt selected from the group consisting of heavy metal nitrates, aluminum nitrate, chromates and heavy metal salts of organic acids, per 100 parts by weight of o-aminobiphenyl and in the presence of air at a pressure in the range of 10–75 lbs. per sq. in. and a reaction temperature in the range of 300–375° C. for a period of time in the range of 6–24 hours.

5. A process of making carbazole comprising intimately contacting o-aminobiphenyl in the liquid phase with an excess of air under pressure in the presence of a heavy metal salt of mono-butyl butyloxy succinic acid at a temperature in the range of 300–375° C. for a period of time in the range of 6–24 hours, and subsequently recovering carbazole from the reaction mixture.

6. A process of making carbazole comprising intimately contacting o-aminobiphenyl in the liquid phase with an excess of air under pressure in the presence of a heavy metal salt of benzoic acid at a temperature in the range of 300–375° C. for a period of time in the range of 6–24 hours, and subsequently recovering carbazole from the reaction mixture.

7. A process of making carbazole comprising intimately contacting o-aminobiphenyl in the liquid phase with an excess of air under pressure in the presence of a metal chromate at a temperature in the range of 300–375° C. for a period of time in the range of 6–24 hours, and subsequently recovering carbazole from the reaction mixture.

COURTNEY CONOVER.

REFERENCES CITED

The following references are of record in the file of this patent:

UNITED STATES PATENTS

| Number | Name | Date |
|---|---|---|
| 2,351,171 | Weinmayr | June 13, 1944 |
| 2,456,378 | Cislak et al. | Dec. 14, 1938 |

FOREIGN PATENTS

| Number | Country | Date |
|---|---|---|
| 168,291 | Germany | Mar. 15, 1906 |